United States Patent [19]
Nelson et al.

[11] Patent Number: 5,347,268
[45] Date of Patent: Sep. 13, 1994

[54] DATA HANDLER FOR HANDLING DATA HAVING MULTIPLE DATA FORMATS

[75] Inventors: Leonard E. Nelson; Robert K. Lockhart, Jr., both of Boynton Beach, Fla.

[73] Assignee: Motorola, Inc., Schaumburg, Ill.

[21] Appl. No.: 781,032

[22] Filed: Oct. 18, 1991

[51] Int. Cl.⁵ .............................. H04Q 7/00
[52] U.S. Cl. .................. 340/825.44; 340/825.3; 370/99
[58] Field of Search ............ 340/825.44, 825.26, 340/825.30; 379/56, 57, 63; 370/82, 83, 99; 455/38.1

[56] References Cited

U.S. PATENT DOCUMENTS 4,845,491  7/1989  Fascenda ................ 340/825.44

Primary Examiner—Michael Horabik
Attorney, Agent, or Firm—Michael L. DeLuca; Thomas G. Berry; Daniel R. Collopy

[57] ABSTRACT

A radio frequency (RF) communication system transmits information including multiple data formats. The RF communication system receives the information (102) and parses the information into a plurality of nibbles (126), each of the nibbles comprising a predetermined number of bits. The plurality of nibbles are then provided to a terminal (10) as a message (154), the message is encoded by the terminal (10), and the encoded message is transmitted to a transmitter (15) for transmission therefrom.

34 Claims, 5 Drawing Sheets

DATA HANDLER FOR HANDLING DATA HAVING MULTIPLE DATA FORMATS

FIELD OF THE INVENTION

This invention relates in general to selective call messaging, and in particular to selective call messaging of data received in multiple data formats.

BACKGROUND OF THE INVENTION

Selective call messaging, such as paging messaging, involves transmitting a message or a page to an intended selective call receiver by radio frequency (RF) signals. The page is received from an originator at a selective call terminal and is encoded into a format recognizable by the receiver. A selective call address assigned to the receiver is added to the message to indicate the intended receiver. The message is then transmitted for reception within a selective call system coverage area in which the receiver is expected to be located.

Conventionally, tone, voice, and numeric pages are received by the selective call terminal from remote devices via telephone audio modems or DTMF tone signalling. In addition, some pages are originated from information supplied to video display terminals (VDTs) coupled directly to the selective call terminal. The format of the signals received from the telephone and the VDTs are known to the selective call terminal and are compatible with the formatting of the selective call signals into known signalling formats such as POCSAG, a paging format developed by the Post Office Code Standardization Advisory Group. For example, numeric information from remote devices is typically received at the selective call terminal as DTMF tone information or alternatively information is received by the paging terminal in seven-bit ASCII format where each four-bit numeric character is represented by a seven-bit ASCII code and transmitted in POCSAG numeric four-bit message format.

With the advent of alphanumeric paging, the information received by selective call terminals is also received in seven-bit ASCII (American Standard Code Information Interchange) format and transmitted in seven-bit POCSAG alpha message format.

Yet, with the increase in alphanumeric paging which can originate from any of a number of input devices capable of coupling to a selective call terminal and with the advent of selective call receivers which can be data reception devices for computers, such as Personal Computers (PCs) or Laptop Computers, multiple data formats may be received by the selective call terminal which may or may not be compatible with the signalling format of the system, such as POCSAG. For example, there is no provision in POCSAG for transmitting eight-bit data or for conveying eight-bit binary data to a paging terminal. Also, the selective call receiver must necessarily be able to receive the signals in POCSAG or a known signalling format and reassemble the data of the message from the signalling format in which the message is received.

One solution would be to modify the selective call terminals to receive eight-bit information and encode this data in the POCSAG format. This solution, though, would be costly to the selective call service provider, as well as requiring down-time for the system to install.

An additional problem results from the form in which the information is received at the terminal. Alphanumeric information may be received by the terminal in standard seven-bit information transfer protocols, such as PET (Paging Entry Terminal protocol, sometimes called TAP for Telocator Alphanumeric Protocol) and TNPP (Telocator Network Paging Protocol). For terminals transmitting POCSAG formatted selective call information, though, certain seven-bit ASCII control characters are not permitted in selective call message fields. Thus, some ASCII seven-bit patterns are not transmittable, even though the patterns may be integral to the selective call message.

Thus, what is needed is a method and apparatus for handling information received in multiple data formats and presenting the information to a selective call terminal in known signalling formats.

SUMMARY OF THE INVENTION

In carrying out the above and other objects of the invention in one form, there is provided a method in an RF communication system for transmitting information comprising multiple data formats. The method comprises the steps of receiving the information, parsing the information into a plurality of nibbles, each of the plurality of nibbles comprising a predetermined number of bits, providing the plurality of nibbles to a terminal as a message, encoding the message, and providing the encoded message to transmitting means for transmission therefrom.

DETAILED DESCRIPTION OF THE INVENTION

Figure 1:
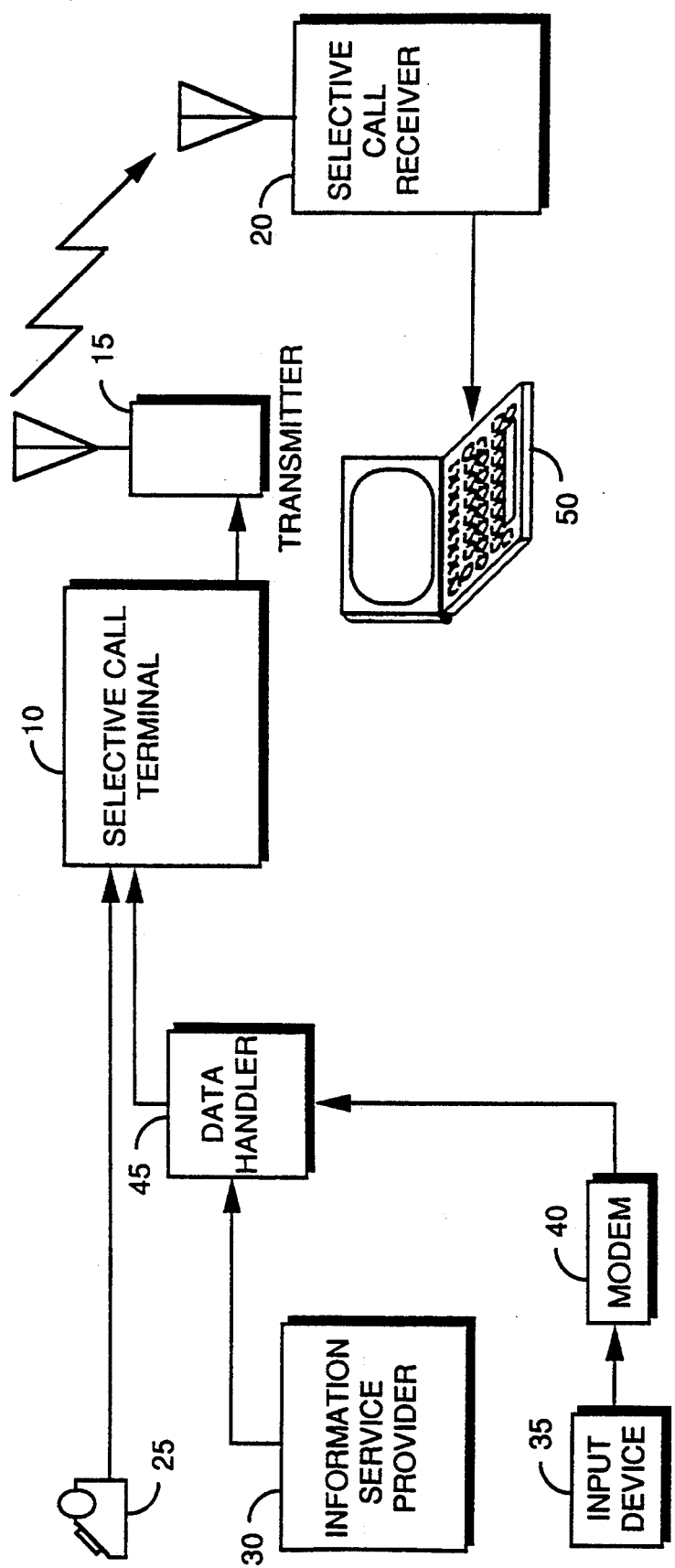
FIG. 1 is a block diagram of a selective call system in accordance with the present invention.

A selective call system, in accordance with the present invention, comprises a selective call terminal 10 which provides selective call signals to a transmitter 15 for transmission to at least one selective call receiver 20. The selective call signals are selective call messages which have been encoded into radio frequency (RF) signals by the selective call terminal 10.

The information comprising the selective call messages is numeric formatted information received from a telephone 25 via the public switched telephone network. Additionally, the information is received from an information service provider 30. The information service provider 30 collects information on sports, stocks, world finance, and other areas of interest to the public. This information is formatted in a known protocol, such as PET or TNPP, utilizing eight-bit and seven-bit ASCII. Finally, the information may be received from another input device 35, e.g. a personal computer or electronic mail service, via a modem 40 in any of a number of data formats.

The information from the information service provider 30 and the other input devices 35 is provided to a data handler 45 which, in accordance with the present invention, alters the format of the information to make it compatible with the selective call paging terminal input. The information is provided from the data handler 45 to the selective call terminal 10 as numeric page information using a standard input protocol such as PET. The selective call terminal then encodes the information received from the data handler 45 into four-bit numeric POCSAG format for transmission from the transmitter 15.

The selective call receiver 20 receives the selective call signal in four-bit numeric POCSAG format and decodes the signal to derive the constituent bits. These bits are then fed as binary data to a laptop computer 50 or other such computing device for utilization thereby.

Figure 2:
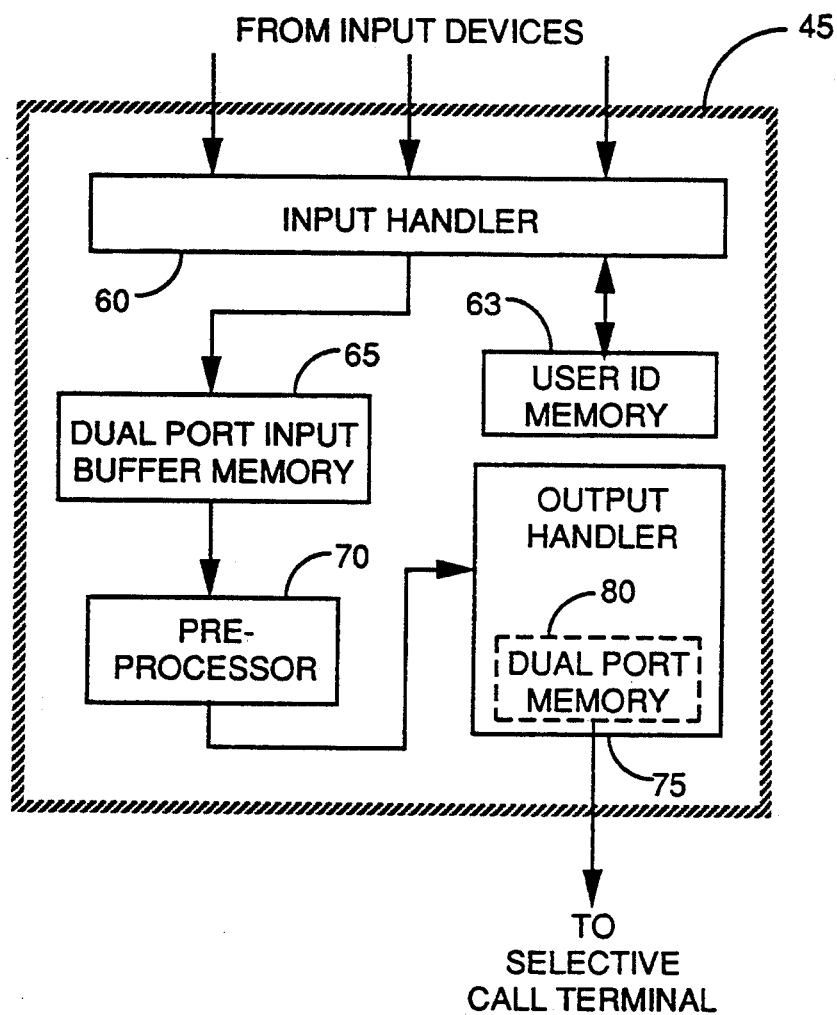
FIG. 2 is a block diagram of a data handler of the selective call system of FIG. 1 in accordance with the present invention.

Referring next to FIG. 2, a block diagram of the data handler 45 (FIG. 1) in accordance with the present invention is depicted. The data handler 45 comprises an input handler 60 having multiple input ports for receiving information from a variety of sources. Some devices, such as the information service provider 30 (FIG. 1) may be hardwired to the input handler 60 or have a direct line coupled thereto. Other input devices 35 (FIG. 1), which do not provide information as regularly as the information service provider 30, are coupled to the input handler 60 via the public switched telephone network at times when they wish to provide selective call information thereto.

The input handler 60 provides the information as a multiplicity of bits to a dual port input buffer memory 65 which stores the information. In addition, the input handler 60 can access data stored in a user ID (identification) memory 63. The data stored in the user ID memory 63 comprises a listing of selective call receiver (or user) IDs which are authorized to receive communications, such as electronic mail. An authorized person can also alter the information stored in the user ID memory 63, i.e., adding user IDs to or deleting user IDs from the listing.

A pre-processor 70 can retrieve the information from the buffer memory 65 and convert the information into a numeric message format. The information is then provided to an output handler 75 for transmission therefrom to the selective call terminal 10 (FIG. 1). The output handler 75 of the preferred embodiment of the present invention stores the information in a dual port memory 80 and, subsequently, transmits the information to the selective call terminal 10 formatted in accordance with the PET protocol, a protocol well known to those skilled in the art.

Conventional selective call terminals 10 recognize the message information conveyed using the PET protocol format as numeric information for transmission as four-bit numeric POCSAG signals. The terminal 10 converts the information back to the corresponding nibbles for transmission as POCSAG numeric messages.

Figure 3:
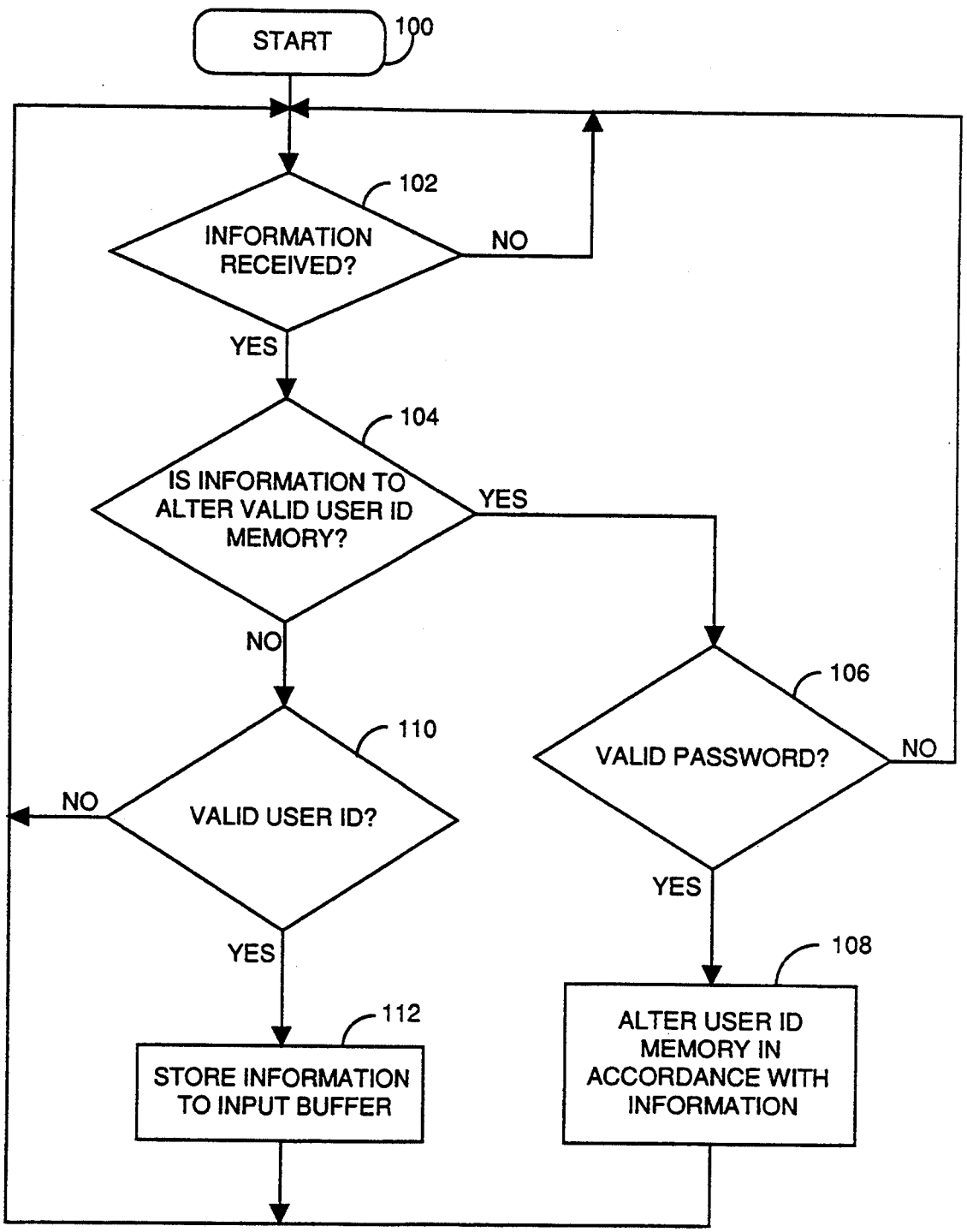
FIG. 3 is a flow diagram of the operation of the input handler of the data handler of FIG. 2 in accordance with the present invention.

Referring to FIG. 3, a flowchart of the operation of the input handler 60 of the data handler 45 (FIG. 2) starts 100 when the data handler 45 is powered up. Processing waits in an idle loop until information is received 102 from one of the input ports.

When information is received 102, processing determines whether the information is a request 104 to alter the valid user ID memory 63 (FIG. 2). If the information received is a request to alter the valid user ID memory 104, the first portion of the information received is examined to determine if a valid password has been received 106. If a valid password has not been received 106, processing returns to the idle loop to await the next reception of information 102. If a valid password is received 106, the user ID memory 63 is altered 108 in accordance with the information received. For example, valid user identification codes can be added or deleted by appropriate information. In this manner, the information service provider 30 can, for example, control which selective call receivers 20 (FIG. 1) can receive electronic mail services via the selective call system.

If the information received is not a request to alter the valid user ID memory 104, a portion of the information is examined to determine if a valid user identification code (i.e., user ID) is present 110. The information received, when not a request to alter the memory 63, comprises a user ID code and message data. To determine if the user ID code is a valid user ID code 110, the user ID code is compared to the listing of valid user identification codes stored in the memory 63. If the user ID code received in the information is equivalent to one of the plurality of valid user ID codes in the listing, the user ID code is a valid user ID code 110 and the information received is stored 112 in the input buffer memory 65 (FIG. 2) via the input port of the dual ports. If a valid user ID has not been received 110, processing returns to the idle loop to await the next reception of information 102.

Figure 4:
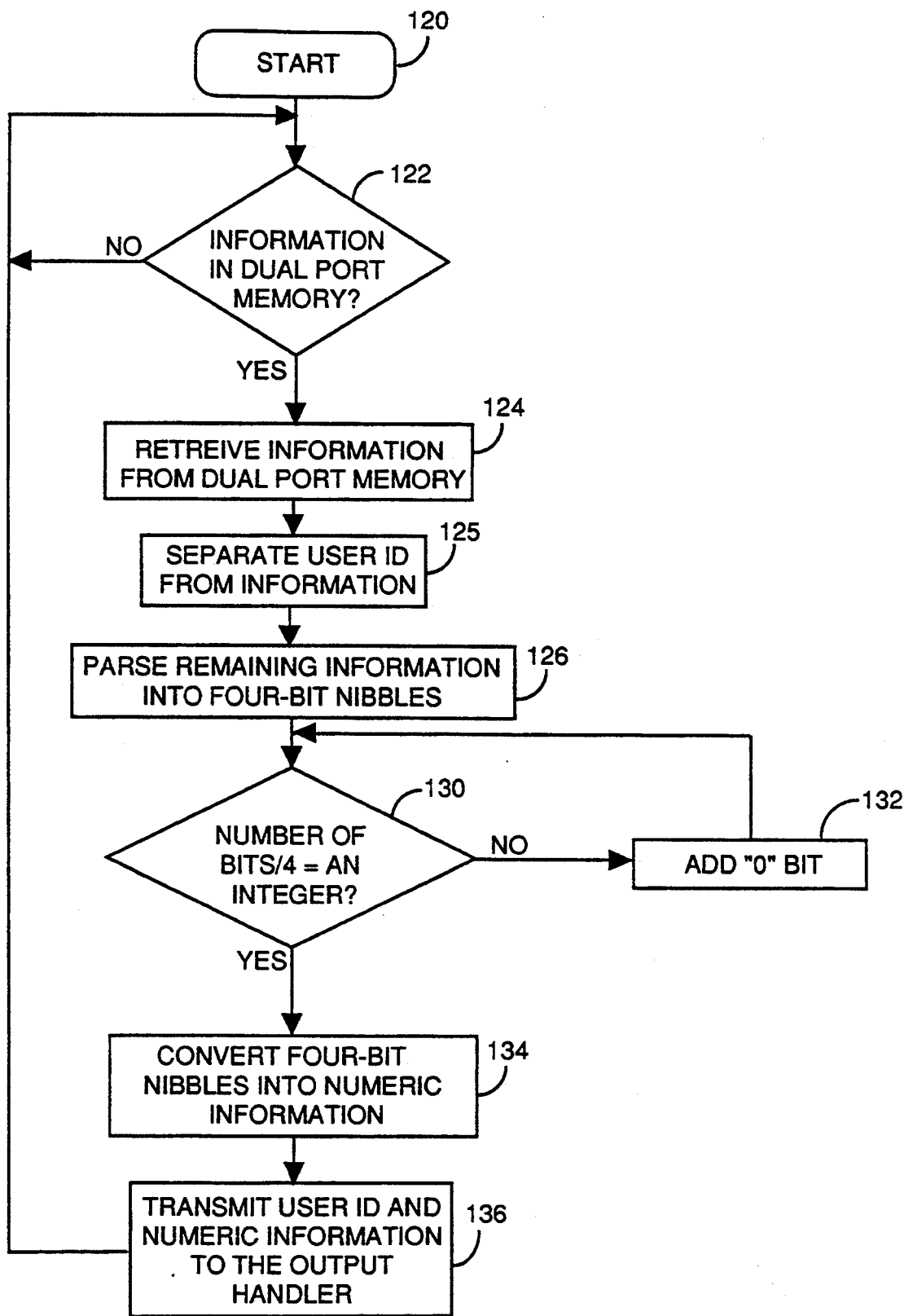
FIG. 4 is a flow diagram of the operation of the preprocessor of the data handler of FIG. 2 in accordance with the present invention.

Referring to FIG. 4, a flowchart of the operation of the pre-processor 70 of the data handler 45 (FIG. 2) starts 120 when the data handler 45 is powered up. The dual port memory 65 has an input port through which the input handler 60 (FIG. 2) stores the information 112 (FIG. 3) in the memory 65. The pre-processor 70 (FIG. 2) examines the output port of the dual ports of the memory 65 to determine 122 if information is stored in the memory 65. If no information is stored in the dual port memory 122, processing waits in an idle loop until information is determined 122 to be stored in the memory 65.

When information is in the dual port memory 122, the pre-processor 70 retrieves 124 the information from the memory 65. The information comprises a user identification code (user ID) and message data. The user ID is separated 125 from the information, and the remaining information (i.e., the message data) is parsed into four-bit nibbles 126. The nibbles are formed from the bits of the message data as received. For example, if the eight-bit ASCII code word "11010110" is received, two nibbles "1101" and "0110" are parsed therefrom. If a seven-bit alphanumeric code word "1010011" followed by a second seven-bit code word "0001011" three nibbles ("1010", "0110" and "0010") are parsed therefrom, with two bits ("11") left over for the next nibble.

According to the preferred embodiment of the present invention, the size of each nibble is four bits. Presently, selective call terminals can receive numeric formatted information for four-bit POCSAG numerical selective call messaging and alphanumeric formatted information for seven-bit POCSAG alphanumeric selective call messaging. The seven-bit format, though has a drawback in that many selective call terminals cannot pass through certain seven-bit ASCII control characters. Thus, if the parsing results in a seven-bit impermissible ASCII control character, the parsed seven-bit code would not be transmitted by the selective call terminal and seven bits of the message would not be received. Since there are no similar restrictions on four-bit characters (i.e., all four-bit characters are transmittable), four bits is the preferred size of each nibble.

The number of bits of the message is next examined 130 to see if this number is an integer number of four-bit nibbles. If not, the message is "padded out" with "0" 132.

When the number of bits of the message data divided by 4 is an integer 130, the four-bit nibbles are converted 134 into numeric message information. For example, if the nibble "0110" is parsed from the information received by the pre-processor 70, the pre-processor converts "0110" to an ASCII "6" or "0110110" the seven-bit ASCII character recognized by the paging terminal. The conversion 134 of the nibbles into the seven-bit ASCII format assures that the information received by the selective call terminal 10 from the data handler 45 (FIG. 1) appears in the same standard format (e.g., PET) as the information received from other inputs to the selective call terminal 10.

Next, the user identification code which identifies the receiver to which the information is intended and which also identifies the message information as numeric message information (i.e., the message data) converted 134 into nibbles and thence into ASCII data) is transmitted 136 to the output handler 75 (FIG. 2) and the operation of the pre-processor 70 returns to examine the dual port input buffer memory 65 (FIG. 2) to determine if information is stored therein 122.

Figure 5:
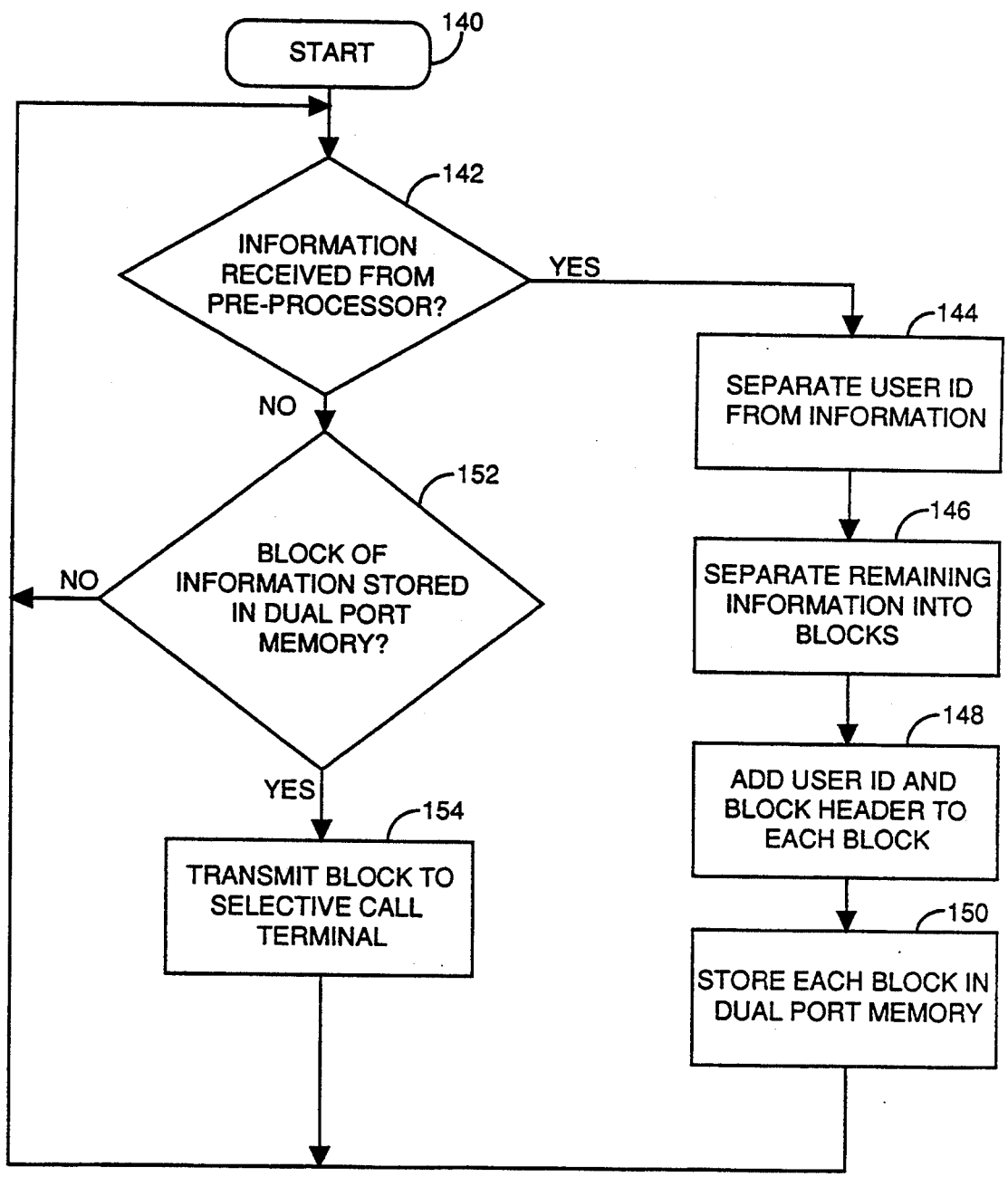
FIG. 5 is a flow diagram of the operation of the output handler of the data handler of FIG. 2 in accordance with the present invention.

Referring to FIG. 5, a flowchart of the operation of the output handler 75 of the data handler 45 (FIG. 2) starts 140 when the data handler 45 is powered up. Processing determines whether information is received 142 from the pre-processor 70. If not, processing determines if a block of information is stored 152 in the dual port memory 80 (FIG. 2). If no information is received 142 or stored 152, processing remains in an idle loop until information is received 142 or stored 152.

When information is received 142 from the pre-processor 70, the user identification code is separated from the information 144, and the remaining information is separated into blocks. 146. The blocks are of a length N. Length N being no greater than the maximum length message that can be handled by a particular paging terminal less the size of the block header to be described. The user ID and an appropriate block header are added to each block 148. According to the preferred embodiment of the present invention, an appropriate block header would at least indicate the block number, the total number of blocks in the message, and the type of message. Then, each block is stored 150 in the dual port memory 80 (FIG. 2). After the blocks are stored 150, processing returns to the idle loop 142, 152.

When processing determines that a block of information is stored 152 in the memory 80, the block, including the user ID and block header, are transmitted 154 to the selective call terminal 10 (FIG. 1). After the blocks are transmitted 154, processing returns to the idle loop 142, 152.

From the foregoing, the information presented to the selective call terminal 10 (FIG. 1) comprises at least one message in a format acceptable to the selective call terminal 10. The selective call terminal 10 will recognize from the user ID that the message is numeric and encode the message by converting the seven-bit ASCII characters into the POCSAG four-bit numeric format in a conventional manner and transmit the resultant messages from the transmitter 15. The selective call receiver 20 assigned the user identification code will receive the selective call message or messages and decode the message(s) in a manner well known to those skilled in the art. The resultant information is provided by the selective call receiver 20 to the computing device 50 which can then reconstruct the information utilizing the block headers to combine multiple messages. In this manner, the computing device 50 can receive information via the data handler 45 which is not necessarily of a format compatible with the selective call terminal 10 without altering or reconstructing the selective call terminal 10.

By now it should be appreciated that there has been provided a method and apparatus for handling information received in multiple data formats and presenting the information to a selective call terminal in known signalling formats.

What is claimed is:

1. A method in a radio frequency (RF) communication system for transmitting information comprising multiple data formats, the method comprising the steps of:
    (a) receiving said information;
    (b) parsing the information into a plurality of nibbles, each of said plurality of nibbles comprising a predetermined number of bits;
    (c) providing said plurality of nibbles to a terminal as a message;
    (d) encoding said message; and
    (e) providing said encoded message to transmitting means for transmission therefrom.

2. The method of claim 1 wherein said predetermined number of bits is four.

3. The method of claim 2 wherein said step (c) of providing said plurality of nibbles to said terminal comprises the step of providing said plurality of nibbles to said terminal as a numeric message.

4. The method of claim 3 wherein the step (d) of encoding comprises the step of encoding said message into POCSAG four-bit numeric format.

5. The method of claim 1 wherein the terminal has a message maximum length, and wherein said step (c) of providing said plurality of nibbles to said terminal comprises the step of providing said plurality of nibbles to said terminal as at least one message, each of said at least one message having a message length equivalent to said message maximum length.

6. The method of claim 1 wherein said information comprises a user identification code and message data, and wherein the step (b) of parsing the information comprises the step of (b1) parsing the message data into a plurality of nibbles, and wherein the step of (c) providing the plurality of nibbles to the terminal comprises the step of (c1) providing the user identification code and the plurality of nibbles to the terminal as said message.

7. The method of claim 6 wherein the terminal has a message maximum length, and wherein said step (c1) of providing the user identification code and the plurality of nibbles to said terminal comprises the step of providing said user identification code and said plurality of nibbles to said terminal as at least one message, each of said at least one message having a message length equivalent to said message maximum length and comprising said user identification code and at least one of said plurality of nibbles.

8. The method of claim 6 wherein the step (b1) of parsing the message data into a plurality of nibbles comprises the steps of:

determining whether the user identification code is a valid user identification code; and parsing the message data into a plurality of nibbles if the user identification code is a valid user identification code.

9. The method of claim 8 wherein the step of determining whether the user identification code is a valid user identification code comprises the steps of:

comparing the user identification code to a listing of a plurality of predetermined valid user identification codes; and determining that the user identification code is a valid user identification code if the user identification code is equivalent to one of said plurality of predetermined valid user identification codes.

10. A selective call system comprising:

input means for receiving information, said information being received in one of a plurality of data formats;

parsing means for parsing said information into a plurality of nibbles, each of said plurality of nibbles comprising a predetermined number of bits;

output means for providing said plurality of nibbles as a selective call message in a predetermined format to a selective call terminal;

selective call terminal means for encoding said selective call message;

transmitting means for transmitting said encoded selective call message; and at least one receiving means for receiving said encoded selective call message.

11. The selective call system of claim 10 wherein said predetermined number of bits is four.

12. The selective call system of claim 10 wherein said information comprises a user identification code and message data, and wherein said parsing means comprises means for parsing said message data into a plurality of nibbles.

13. The selective call system of claim 12 wherein the selective call system has a message maximum length, and wherein said output means comprises:

means for separating said plurality of nibbles into a plurality of message blocks, each of said plurality of message blocks including said user identification code and having a message block length equivalent to or less than said message maximum length; and means for providing said plurality of message blocks as a plurality of selective call messages in said predetermined format to said selective call terminal means.

14. The selective call system of claim 10 wherein said information comprises a user identification code and message data, and wherein said input means comprises:

means for storing a plurality of valid user identification codes;

means for comparing said user identification code to each of said plurality of valid user identification codes; and means for terminating processing of said information if said user identification code is not equivalent to one of said plurality of valid user identification codes.

15. A data handler for receiving information in one of a plurality of data formats and for providing said information to a selective call terminal, the data handler comprising:

receiving means for receiving said information;

parsing means for parsing said information into a plurality of nibbles;

conversion means for converting said plurality of nibbles into a predetermined format to form selective call information; and transmitting means for providing said selective call information to said selective call terminal.

16. The data handler of claim 15 wherein each of said plurality of nibbles comprises a predetermined number of bits.

17. The data handler of claim 16 wherein said predetermined number is four.

18. The data handler of claim 15 wherein said information comprises a user identification code and message data, and wherein said parsing means comprises means for parsing said message data into a plurality of nibbles.

19. The data handler of claim 18 wherein said selective call terminal has an input message maximum length, and wherein said transmitting means comprises:

means for separating said plurality of nibbles into a plurality of message blocks, each of said plurality of message blocks including said user identification code and having a message block length equivalent to or less than said input message maximum length; and means for providing said plurality of message blocks as a plurality of selective call messages to said selective call terminal.

20. The data handler of claim 15 wherein said information comprises a user identification code and message data, and wherein said receiving means comprises:

means for storing a plurality of valid user identification codes;

means for comparing said user identification code to each of said plurality of valid user identification codes; and means for terminating processing of said information if said user identification code is not equivalent to one of said plurality of valid user identification codes.

21. A method in a radio frequency (RF) communication system for transmitting information comprising multiple data formats, the method comprising the steps of:

(a) receiving said information;
(b) parsing the information into a plurality of portions, each of said plurality of portions comprising a predetermined number of bits;
(c) providing each of said plurality of portions to a terminal as one of a plurality of messages;
(d) encoding each of said plurality of messages; and
(e) providing each of said plurality of encoded messages to transmitting means for transmission therefrom.

22. The method of claim 21 wherein said step (c) of providing each of said plurality of portions to said terminal comprises the step of providing each of said plurality of portions to said terminal as one of a plurality of numeric messages.

23. The method of claim 21 wherein the terminal has a message maximum length, and wherein said step (c) of providing each of said plurality of portions to said terminal comprises the step of providing each of said plurality of portions to said terminal as one of said plurality of messages, each of said plurality of messages having a message length equivalent to said message maximum length.

24. The method of claim 21 wherein said information comprises a user identification code and message data, and wherein the step (b) of parsing the information comprises the step of parsing the message data into a plurality of portions, and wherein the step of (c) providing each of the plurality of portions to the terminal comprises the step of providing the user identification code and each of the plurality of portions to the terminal as said plurality of messages, each of said plurality of messages comprising the user identification code and one of the plurality of portions of the information.

25. The method of claim 24 wherein the step of parsing the message data into a plurality of portions comprises the steps of:

determining whether the user identification code is a valid user identification code; and parsing the message data into a plurality of portions if the user identification code is a valid user identification code.

26. The method of claim 25 wherein the step of determining whether the user identification code is a valid user identification code comprises the steps of:

comparing the user identification code to a listing of a plurality of predetermined valid user identification codes;

determining that the user identification code is a valid user identification code if the user identification code is equivalent to one of said plurality of predetermined valid user identification codes.

27. A selective call system comprising:

input means for receiving information, said information being received in one of a plurality of data formats;

parsing means for parsing said information into a plurality of portions, each of said plurality of portions comprising a predetermined number of bits;

output means for providing each of said plurality of portions as one of a plurality of selective call messages in a predetermined format to a selective call terminal;

selective call terminal means for encoding said plurality of selective call messages;

transmitting means for transmitting said plurality of encoded selective call messages; and at least one receiving means for receiving said plurality of selective call messages.

28. The selective call system of claim 27 wherein said information comprises a user identification code and message data, and wherein said parsing means comprises means for parsing said message data into said plurality of portions.

29. The selective call system of claim 28 wherein the selective call system has a message maximum length, and wherein said output means comprises:

means for separating said plurality of portions into a plurality of message blocks, each of said plurality of message blocks including said user identification code and having a message block length equivalent to or less than said message maximum length; and means for providing said plurality of message blocks as a plurality of selective call messages in said predetermined format to said selective call terminal means.

30. A data handler for receiving information in one of a plurality of data formats and for providing said information to a selective call terminal, the data handler comprising:

receiving means for receiving said information;

parsing means for parsing said information into a plurality of portions;

conversion means for converting each of said plurality of portions into a predetermined format to form selective call information; and transmitting means for providing said selective call information to said selective call terminal.

31. The data handler of claim 30 wherein each of said plurality of portions comprises a predetermined number of bits.

32. The data handler of claim 30 wherein said information comprises a user identification code and message data, and wherein said parsing means comprises means for parsing said message data into said plurality of portions.

33. The data handler of claim 32 wherein said selective call terminal has an input message maximum length, and wherein said transmitting means comprises:

means for separating said plurality of portions into a plurality of message blocks, each of said plurality of message blocks including said user identification code and having a message block length equivalent to or less than said input message maximum length; and means for providing said plurality of message blocks as a plurality of selective call messages to said selective call terminal.

34. The data handler of claim 30 wherein said information comprises a user identification code and message data, and wherein said receiving means comprises:

means for storing a plurality of valid user identification codes;

means for comparing said user identification code to each of said plurality of valid user identification codes; and means for terminating processing of said information if said user identification code is not equivalent to one of said plurality of valid user identification codes.

* * * * *